US005577679A

United States Patent [19]
Thomas

[11] Patent Number: 5,577,679
[45] Date of Patent: Nov. 26, 1996

[54] FISHING ROD WHICH REGULATES ROTATIONAL SPEED OF SPOOL DURING CASTING

[76] Inventor: Nelson A. Thomas, Rte. 4 Box 1227, Marion, S.C. 29571

[21] Appl. No.: 328,146

[22] Filed: Oct. 24, 1994

[51] Int. Cl.$^6$ ............................................. A01K 89/02
[52] U.S. Cl. ........................ 242/286; 242/223; 242/287
[58] Field of Search ........................ 242/223, 286, 242/287, 288, 305, 333.7, 421.2, 421.4

[56] References Cited

U.S. PATENT DOCUMENTS

| | | | |
|---|---|---|---|
| 1,554,133 | 9/1925 | Schmid | 242/287 |
| 2,588,837 | 3/1952 | Holm | 242/287 |
| 3,281,634 | 10/1966 | Studer | 242/421.4 X |
| 3,532,288 | 10/1970 | Di Cicco | 242/287 |
| 3,921,220 | 11/1975 | Primosch et al. | 242/333.7 X |
| 4,117,990 | 10/1978 | Denny | 242/287 |
| 4,381,089 | 4/1983 | Kondo | 242/421.4 X |
| 4,402,470 | 9/1983 | Hamayasu | 242/286 |
| 4,940,194 | 7/1990 | Young | 242/223 X |
| 5,236,147 | 8/1993 | Kaneko | 242/223 |
| 5,345,691 | 9/1994 | Falk et al. | 242/223 X |
| 5,363,565 | 11/1994 | Kaneko | 242/223 X |
| 5,427,323 | 6/1995 | Kaneko et al. | 242/223 |
| 5,433,539 | 7/1995 | German | 242/421.4 X |

FOREIGN PATENT DOCUMENTS

| | | | |
|---|---|---|---|
| 57-15847 | 4/1982 | Japan | 242/223 |
| 382137 | 5/1973 | U.S.S.R. | 242/333.7 |

*Primary Examiner*—Daniel P. Stodola
*Attorney, Agent, or Firm*—Cushman Darby & Cushman; Intellectual Property Group of Pillsbury; Madison & Sutro LLP

[57] ABSTRACT

A fishing rod detects conditions indicative of backlash and controls the rate of rotation of a reel spool to prevent that condition. The rotational speed of the spool is regulated based on a comparison between the rate of line released from the reel and the rate of line cast from the rod. Alternatively, the rotational speed of the spool is regulated based on a comparison between the amount of line released from the reel and the amount of line cast from the rod. The rotational speed of the reel is also regulated based on the slope of the fishing line between the spool to the rod, where a decreased slope indicates excess line release resulting in increased braking of the reel spool.

3 Claims, 3 Drawing Sheets

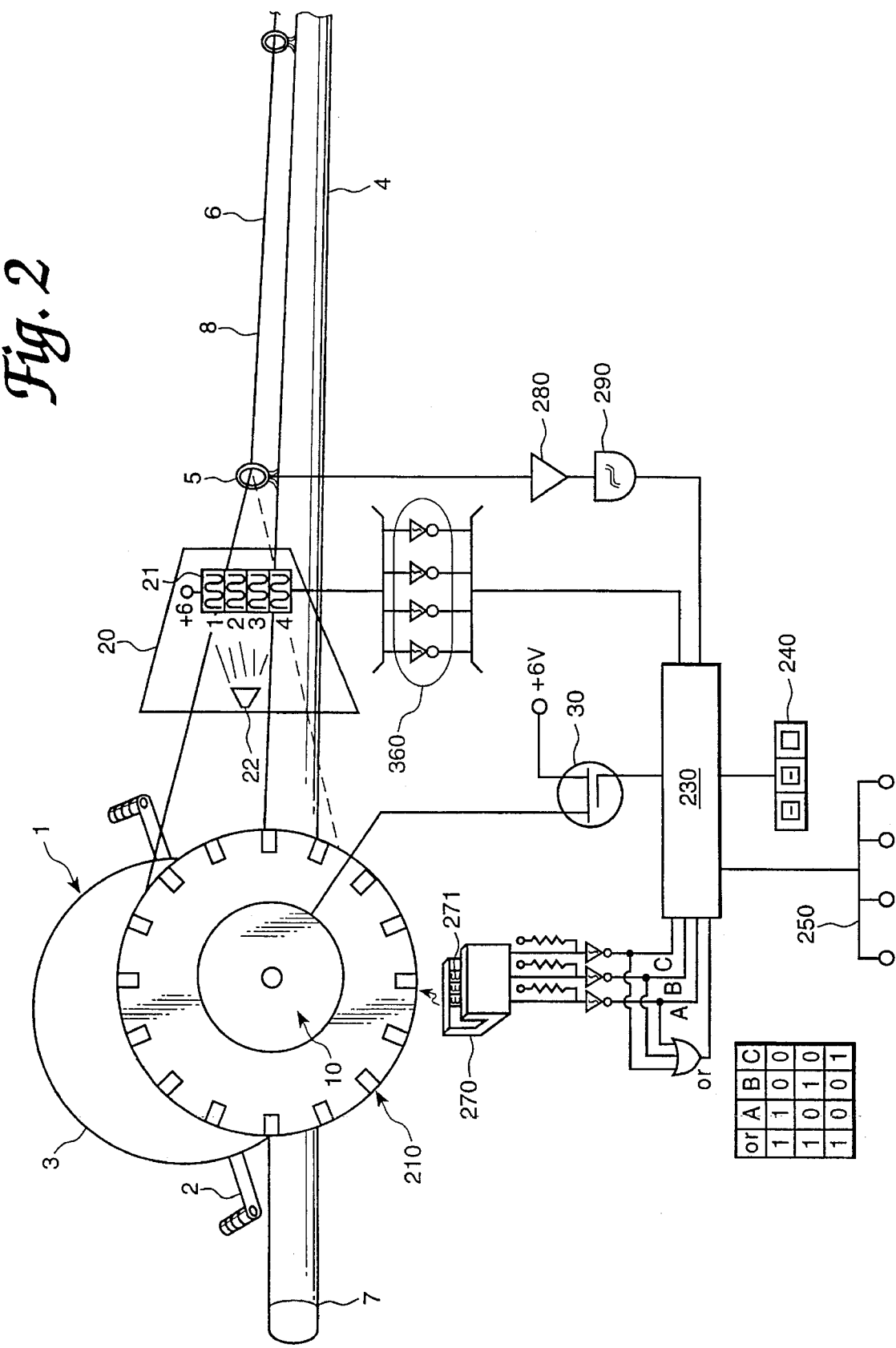

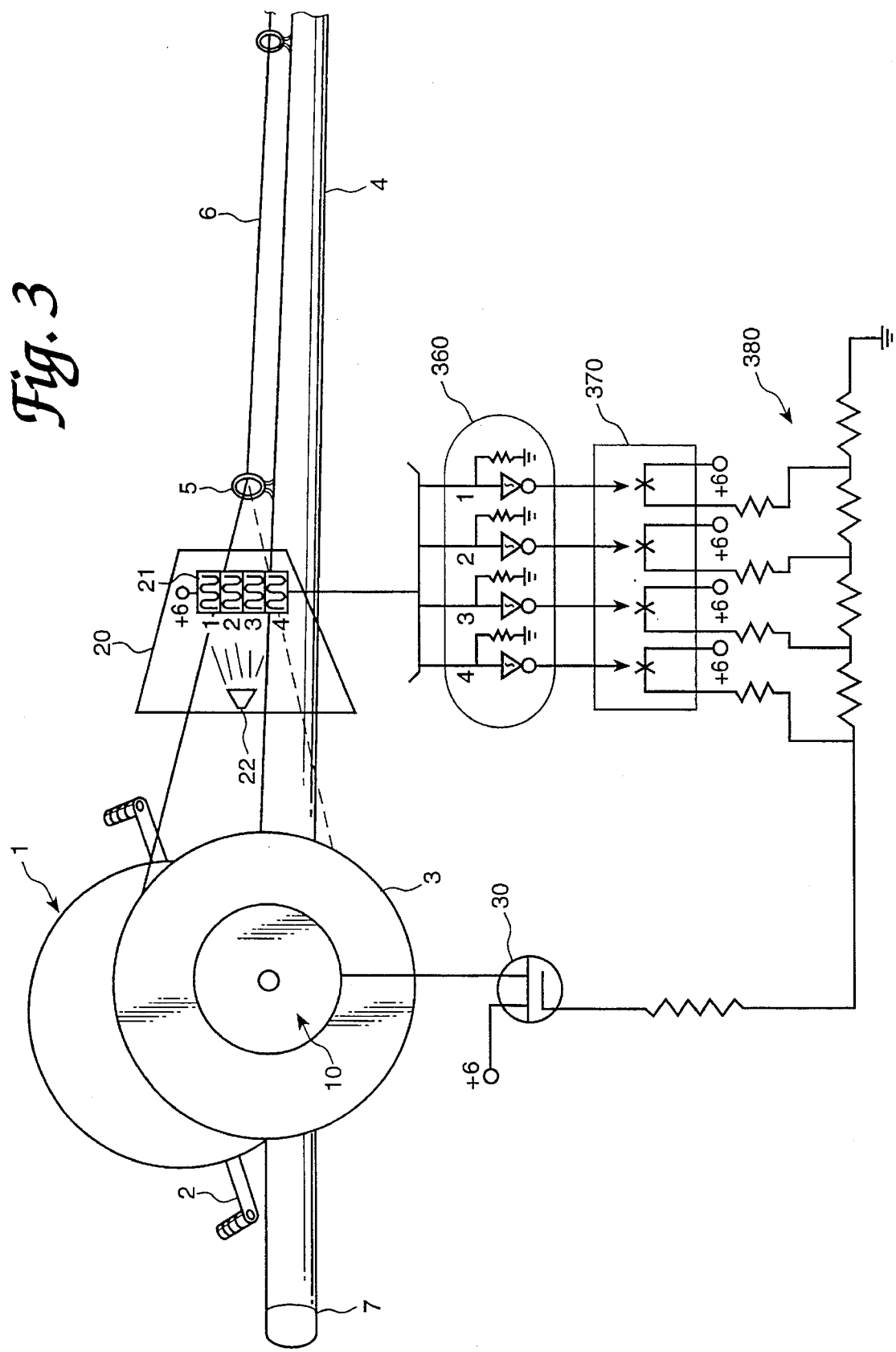

FISHING ROD WHICH REGULATES ROTATIONAL SPEED OF SPOOL DURING CASTING

BACKGROUND OF THE INVENTION

A. Field of the Invention

The present invention relates to a fishing device, and more particularly to a fishing device which regulates the rotational speed of a spool on a reel to avoid backlash.

B. Description of the Related Art

As illustrated in FIG. 1, a conventional fishing device includes bait casting fishing reel 1 and shaft 4, the reel being mounted on a proximate end of the shaft near operator handle 7. Eye brackets 5 may be mounted along the shaft to direct fishing line 6 between the reel and a distant end of the shaft.

The reel is used to assist an operator in discharging (casting) or collect (reeling in) line with the fishing device. The reel includes crank 2, rotatable spool 3, clutch (not shown) and drag mechanism (not shown). Crank 2 is used by an operator to reel in fishing line to be stored on rotatable spool 3.

The clutch-type mechanism is disengaged for allowing spool rotation and subsequent line payout. The clutch is therefore disengaged to allow the operator to cast line out. When the clutch mechanism is engaged, the drag mechanism retards spool rotation on line payout. More specifically, conventional drag mechanisms hinder the release of line from the spool only when the clutch is engaged, not during casting operations.

One problem facing users of conventional fishing devices is the occurrence of backlash, a condition which occurs when the Spool rotates faster than the line is fed out. Because the spool rotates to release line faster than line is paid out, an excess amount of line accumulates at the reel exit. That accumulation of excess line may become entangled or cause other problems.

Backlash often occurs during a casting operation as the reel is allowed to free-wheel. This condition is particularly evident when the bait has reached its casting destination and the reel continues to rotate.

To help reduce the likelihood of a backlash condition, conventional fishing devices have been equipped with various devices for drag control.

For instance, in U.S. Pat. No. 4,142,694, Rankin Jr. describes a bait casting fishing reel which engages a drag mechanism when a cast is completed. However, Rankin Jr. allows for total free spooling during a casting operation, the brake only being engaged "at the end of the cast" (col. 8, lines 26–30). More specifically, a brake is manually applied to the spool only after the bait strikes the water surface at the completion of the cast.

U.S. Pat. No. 4,905,930, Puryear et al. describes a magnetic drag mechanism for varying the amount of drag applied to a spool. However, similar to Rankin Jr, Puryear provides "clutch means . . . to permit the spool to free-wheel during casting" (col. 6, lines 47–50).

Conventional fishing devices do not control the rate of rotation of the spool while a clutch is operated to release line, e.g. during a casting operation. Conventional fishing devices also fail to synchronize the amount of line paid out and the amount of line released from the spool. Thus, conventional fishing devices are susceptible to backlash and other such problems.

SUMMARY OF THE INVENTION

The present invention has an object to prevent backlash conditions, thereby improving conventional fishing devices.

In order to achieve the above object, according to the present invention, there is provided a fishing apparatus including a rod having an elongated axis; a reel mounted on said rod having a spool and a reeling mechanism, the spool for storing line and the reeling mechanism for releasing and collecting line; a mechanism for determining a spool rotation rate which corresponds to a rate at which line is released from said spool; a mechanism for determining a rate at which line passes a particular position on said rod; a mechanism for comparing said spool rotation rate with said line passing rate; and an assembly for adjusting the spool rotation rate based on the comparison.

The reel spool may have slots formed in a periphery thereof which are used for determining the spool rotation rate. The line may include a periodically spaced detectable material which is used for determining the rate of line cast from the rod.

The assembly used to adjust the spool rotation rate may include an adjustable drag which is applied to the reel. The assembly may be used to maintain a relationship between that spool rotation rate and the rate of line being cast. An effective radius of the spool which is related to an amount of line stored on the spool may be used to maintain that relationship.

Similar control of the rotational speed of the reel may be achieved through a comparison between an amount of line passing a particular point on the rod and an amount of line being released from the reel. By employing such control, a display mechanism may be incorporated to display an amount of line presently released. That amount may be based on the amount of line released from the spool or on the amount of line passing said particular position on said rod. Furthermore, a switch may be incorporated for presetting a maximum amount of line to be released from the reel.

A second embodiment of the invention achieves prevention of backlash through determination of slope between the reel and the shaft upon which the reel is mounted. According to the second embodiment of this invention, there is provided a fishing apparatus including: a shaft having an elongated axis; a reel mounted on the shaft having a spool and a reeling mechanism, the spool for storing line and the reeling mechanism for releasing and collecting line; a slope determining mechanism for determining a slope of said fishing line between the reel and the shaft; and a braking assembly for adjusting a rate of release of the reeling mechanism based on the detected slope.

The slope determining means may include a parallel array opto-interrupter which may have more than one photocell, and the braking assembly may include an adjustable drag applied to the reel.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is a perspective view of a casting type fishing rod in accordance with a first embodiment of the present invention; and, FIG. 3 is a perspective view of a casting type fishing rod in accordance with a second embodiment of the present invention.

DESCRIPTION OF THE PREFERRED EMBODIMENTS

Figure 1:
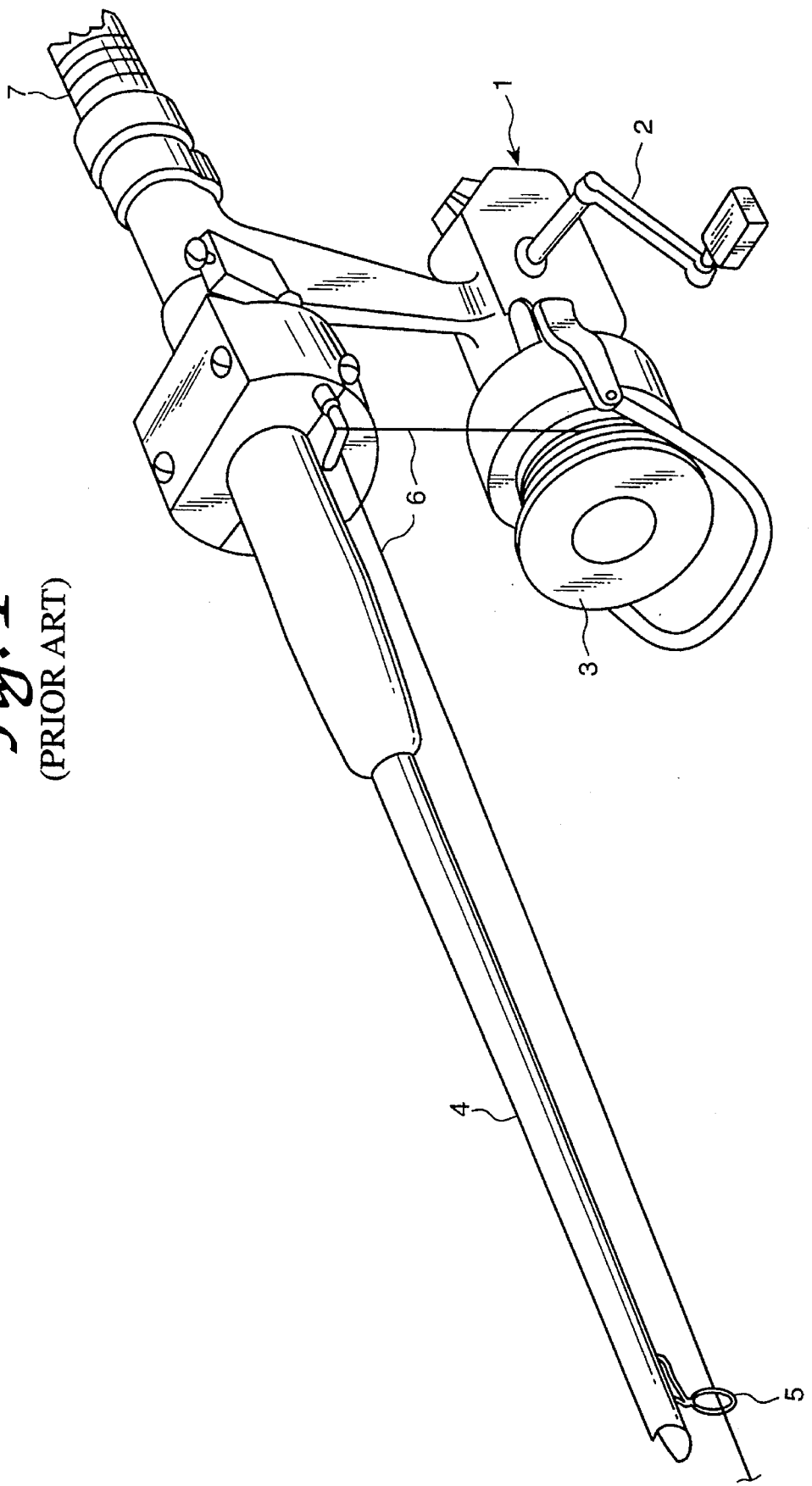
FIG. 1 is a perspective view of a conventional fishing rod.

Referring to the drawings in greater detail, and first to FIG. 2, a fishing device is disclosed.

Reel 1 is mounted on shaft 4 and positioned near an operator handle 7. Reel 1 may be any of a family of bait casting fishing reels and shaft 4 may be any appropriate length, thickness or composition.

The reel includes a clutch mechanism (not shown), crank 2 and rotatable spool 3, fishing line 6 being stored on the spool. When the clutch mechanism is disengaged, the spool is permitted to rotate and release fishing line, this procedure generally being referred to as "casting line out".

Alternatively, when the clutch mechanism is engaged, fishing line is no longer released from the spool. Instead, previously released fishing line may be collected using crank 2, this operation being generally referred to as "reeling line in". Eye brackets 5 are mounted on the shaft to guide fishing line which is being either cast out or reeled in.

The fishing line contains material 8 which is capable of being sensed. The fishing line may be fabricated to incorporate this material, or the material may be applied as a coating to the fishing line.

The detectable material is periodically positioned in the fishing line to ensure even spacing, for instance every half centimeter. It is generally has magnetic, optic, or radioactive properties, but may have other properties used for detection.

A sensor for detecting the material may be located at any position between the reel and the shaft end, but is preferably located in one of the eye brackets 5. As the fishing line is reeled in or cast out, pulses are induced in the sensor. Because these pulses correspond with the periodic spacing of the detectable material in the line, they can be used to calculate the amount of line being reeled in or cast out. Therefore, the number of induced pulses per time represents the rate at which line is either reeled in or cast out.

A processor such as microcontroller 230 is used to calculate the rate or the amount of line based on the number of pulses induced in the sensor. Amplifier 280 and Schmitt trigger 290 are used to enable communication between the processor and the sensor, where amplifier 280 amplifies the pulses induced in the sensor and Schmitt trigger 290 provides pulse triggering for communication with the processor.

In accordance with the above, the amount of fishing line released from or collected by the fishing device is calculated by the processor as a cast count.

The fishing device also includes a device for detecting an amount of line released from or collected by the spool itself. One such device, as shown in FIG. 2, includes a parallel array opto-interrupter 270 which is positioned about the edge of rotatable spool 3, the spool having slots 210 periodically spaced along its circumference. The opto-interrupter detects pulses of light corresponding to the passage of slots. The detected pulses are then counted by processor 230 to determine the number of spool rotations.

The processor calculates the amount of line released from the spool by relating the number of spool rotations to the outer radius of the fishing line stored on the spool. For that reason, it is important to accurately determine the outer radius of the stored fishing line.

When all of the line is reeled in, an outer radius of the line stored on the spool is determined and a corresponding value is reset. This reset can be performed manually using one of the operator controlled switches 250 or it can be performed automatically. As pulses are detected corresponding to the release of line from the spool, the outer radius of line stored on the spool is updated.

For instance, as line is released from the spool, the outer radius of the line remaining on the spool decreases. As this outer line radius decreases, the amount of line released per spool rotation also decreases. Accordingly, based on the number of spool rotations and the outer radius of line stored on the spool, the processor generates a count corresponding to the amount of line released from the spool.

While the line clutch is disengaged, and casting is performed, the processor compares the spool count with the casting count. When the spool count exceeds the casting count, excess line accumulates at the point of release of the spool. Therefore, the processor applies a control voltage to transistor 30 which provides a braking voltage to brake 10, an armature of which is connected to the reel axle. The brake therefore slows the rotation of the spool to allow the two counts to resynchronize, thus preventing backlash.

In FIG. 2, the forward side of the brake is shown. The brake housing may be mounted stationary with the slotted reel and opto-interrupter enclosed to prevent light interference.

Parallel array opto-interrupter 270 may include a plurality of photocells 271 for determining whether line is being reeled in or cast out. As the reel rotates and slots are encountered, only one of the photocells are activated at a time. As the spool and its associated slots progress clockwise a pattern of photocells will be activated. Alternatively, as the spool and slots progress counter-clockwise, the opposite pattern of photocells will be activated. Thus, the rotational direction of the spool and corresponding direction of line may be determined based on the pattern of photocells activated.

For instance, if a clockwise spool rotation results in an activation pattern of A, B, C, a counter-clockwise spool rotation results in an activation pattern of C, B, A. Based on these activation patterns, the rotation direction of the spool may be discerned.

Additional features include display 240 for indicating the amount of line out, rate of line release, direction of reel rotation, or any other pertinent information. Also, the operator controlled switches 250 may be used to preset an amount of line to be cast or to indicate an imminent casting condition.

Alternatively, a rate of release from the fishing device and its spool are separately calculated by the processor based on the spool count and the casting count. A control current for the braking mechanism may be generated based on a comparison of these rates.

A second embodiment of the present invention is described with reference to FIGS. 2 and 3.

The fishing device of the second embodiment includes a detector device 20 which is responsive to the slope of fishing line between the reel and the rod, or more specifically between the reel and the first eye bracket. As backlash conditions develop, excess line accumulates at the point of exit from the spool. The accumulation of line causes the slope to decrease until it finally reaches the dashed line where backlash occurs absent intervention. However, by controlling the braking mechanism to slow the rotation of the spool based on the slope of the fishing line, this condition is prevented.

As illustrated in FIG. 3, the fishing device of the second embodiment includes reel 1 having a clutch mechanism (not shown), crank 2 and rotatable spool 3. The reel is mounted on shaft 4 having a plurality of eye brackets 5, and fishing line 6 is stored on the spool. A brake mechanism 10 which is controlled by a braking voltage generated by a transistor driver 30 engages rotatable spool 3 to control its rotational speed.

Parallel array interrupter 20 is positioned between the reel and the first eye bracket. It is used to detect the slope of the fishing line from the spool to the eye bracket. It includes a plurality of photosensitive elements 21 and infrared emitter 22.

Interruption of element 1 indicates that the line is in proper position while interruption of element 2 indicates that slight braking is necessary. Interruption of elements 3 or 4 indicate that the fishing line is approaching the backlash threshold, that the reel is spinning too fast relative to outgoing line, and that increased or maximum braking must be applied.

More specifically, the slope of the line decreases as excess line accumulates. Such a decreased slope results in blockage of an increased number of photocells on interrupter 20. As more photocells are blocked, the amount of current applied to the brake increases. Therefore, as the amount of excess line increases, the braking increases to slow the spool.

Schmitt amp invertor 360, quad bilateral switch 370 and R2R network 380 are used to create a control voltage corresponding to the number of photocells blocked by the excess line. The control voltage is applied to the base of transistor driver 30. Transistor driver 30 then generates a braking voltage to control braking mechanism 10.

Interruption of the last photocell results in maximum braking, as indicated by the dashed line representing a threshold for backlash. As the brake is applied, the reel slows and the line ascends up to the minimum braking position where less photocells are blocked.

The objects and advantages achieved through the above described fishing device are applicable to any device which could be used to release and collect line from a storage device, especially devices susceptible to similar backlash conditions. For instance, the above may be applied to any device where the rate of line actually released may not correspond to the rate of line released from the storage device.

It should therefore be understood that the specific fishing devices illustrated and described herein are intended to be representative only, as certain changes may be made therein without departing from the spirit and scope of this invention. Accordingly, reference should be made to the following appended claims in determining the full scope of the invention.

I claim:

1. A fishing apparatus comprising:

a shaft having an elongated axis;

a reel mounted on said shaft having a spool and a reeling mechanism, said spool for storing line and said reeling mechanism for releasing and collecting said line;

slope determining means for determining a slope of said fishing line between said reel and said shaft; and braking means for adjusting a rate of release of said reeling mechanism based on said detected slope, wherein said slope determining means includes a parallel array opto-interrupter.

2. The fishing apparatus recited by claim 1, wherein said parallel array opto-interrupter includes more than one photocell.

3. A fishing apparatus comprising:

a shaft having an elongated axis;

a reel mounted on said shaft having a spool and a reeling mechanism, said spool for storing line and said reeling mechanism for releasing and collecting said line;

a slope determining device for determining a slope of said fishing line between said reel and said shaft; and a brake adjusting a rate of release of said reeling mechanism based on said detected slope, wherein said slope determining device includes a parallel array opto-interrupter.

* * * * *